April 5, 1960     T. BACKUS     2,931,237
AUTOMOTIVE DEVICE

Filed Dec. 2, 1957     4 Sheets-Sheet 1

INVENTOR.
THOMAS BACKUS
BY
Woodhams Blanchard & Flynn
ATTORNEYS

April 5, 1960      T. BACKUS      2,931,237
AUTOMOTIVE DEVICE
Filed Dec. 2, 1957      4 Sheets-Sheet 2
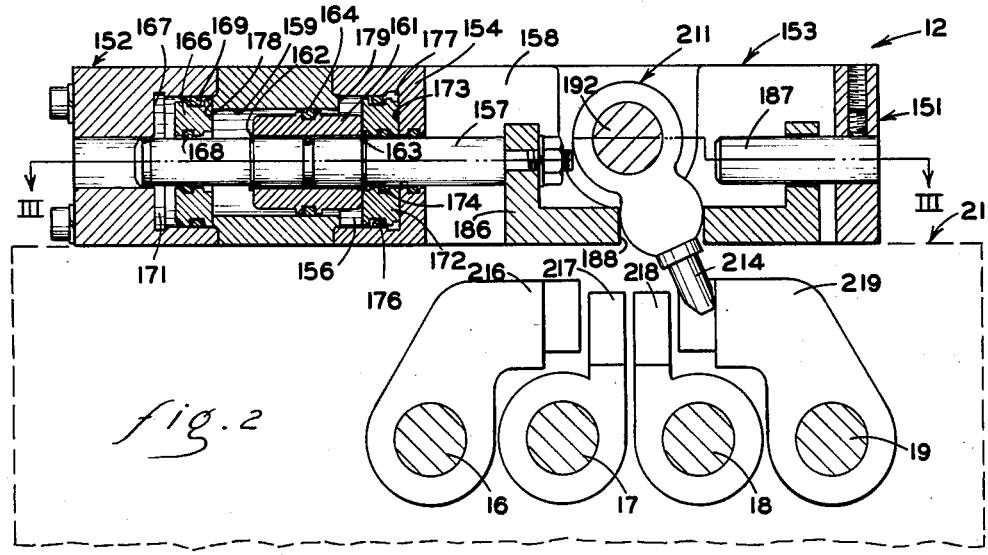
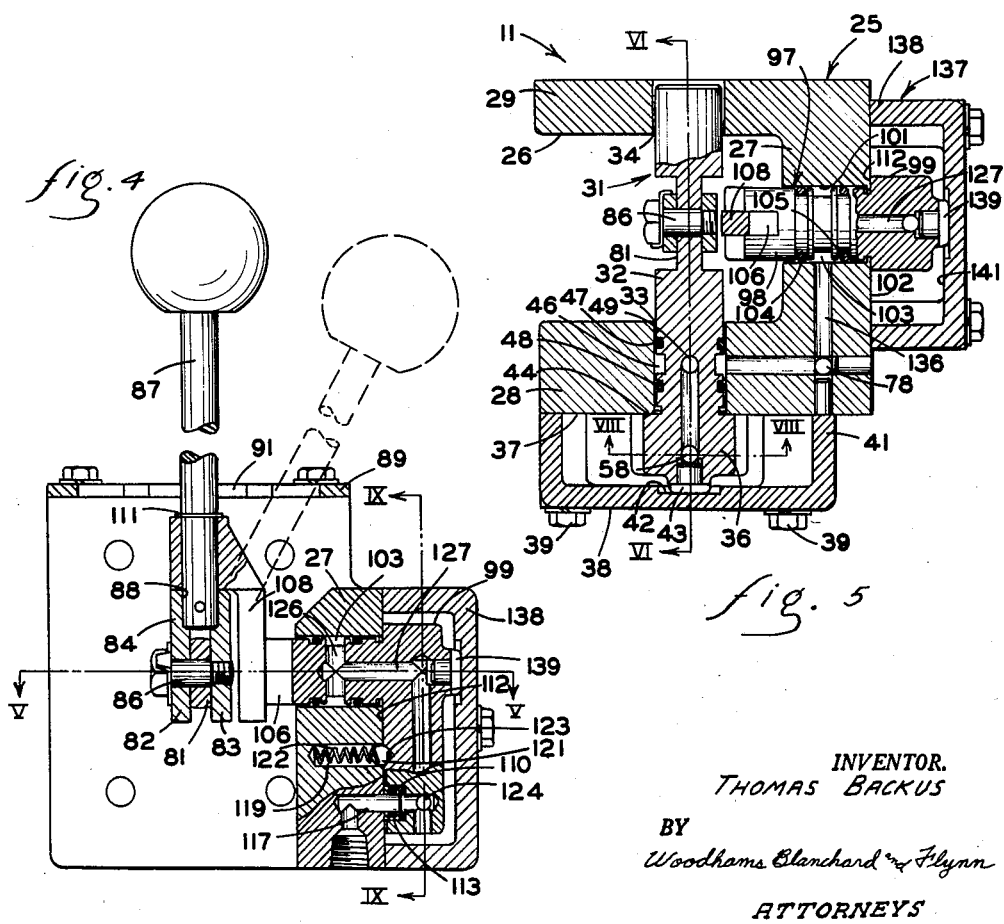
INVENTOR.
THOMAS BACKUS
BY
Woodhams Blanchard & Flynn
ATTORNEYS

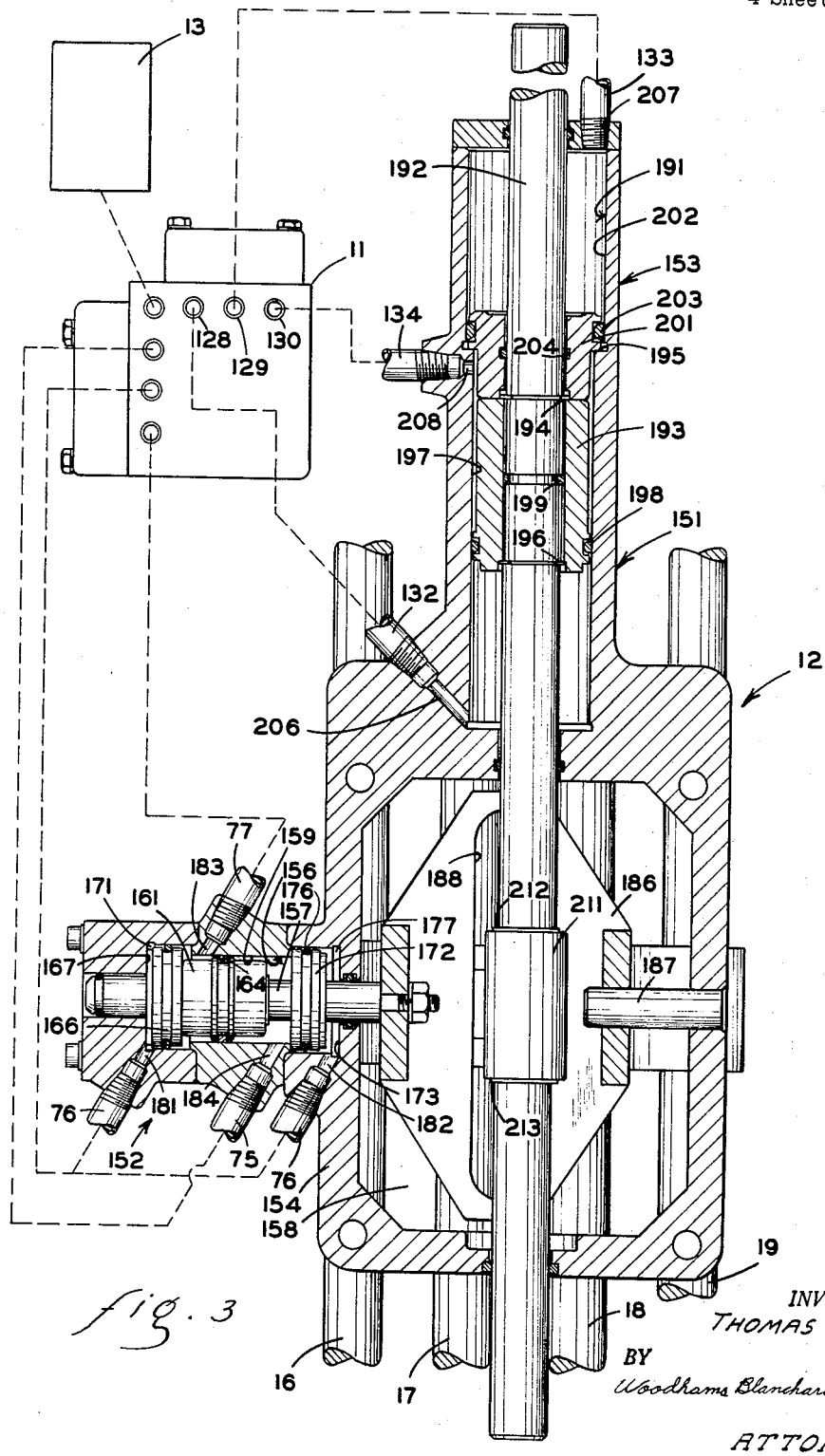

April 5, 1960 T. BACKUS 2,931,237
AUTOMOTIVE DEVICE
Filed Dec. 2, 1957 4 Sheets-Sheet 4
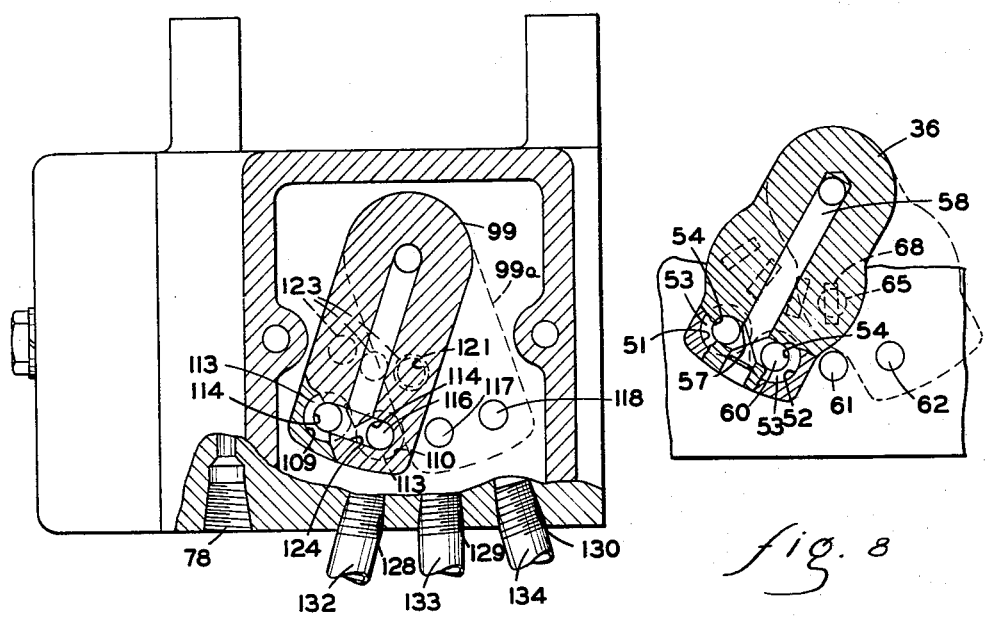
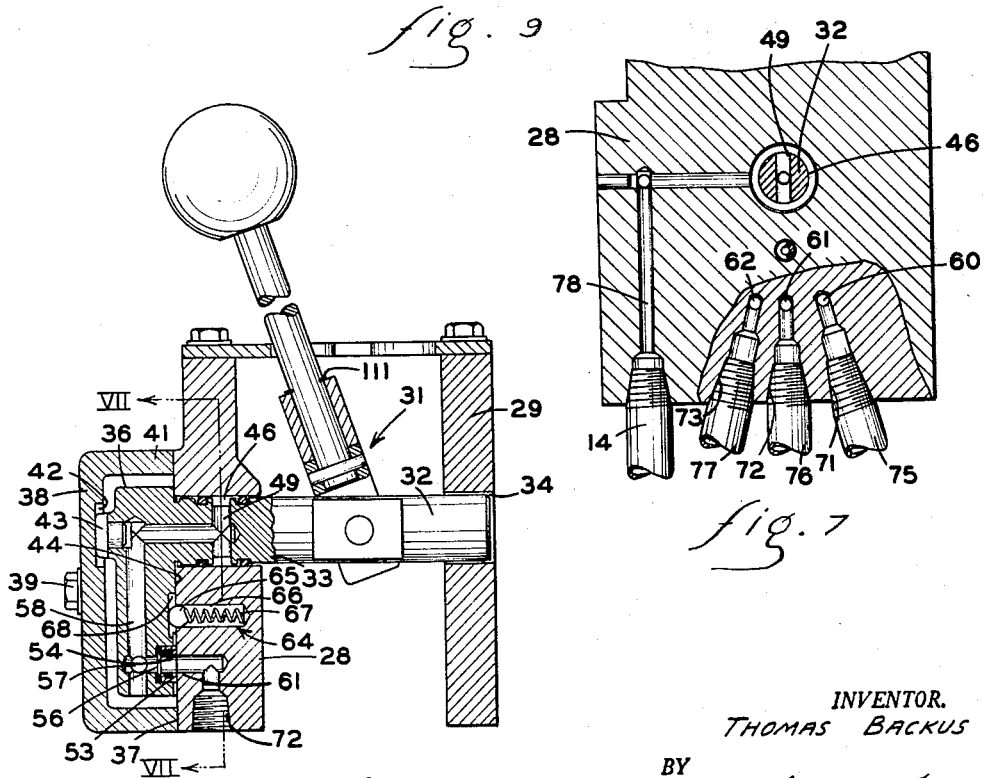
INVENTOR.
THOMAS BACKUS
BY
Woodhams Blanchard & Flynn
ATTORNEYS

2,931,237
AUTOMOTIVE DEVICE

Thomas Backus, Kalamazoo, Mich., assignor, by mesne assignments, to Fuller Manufacturing Company, a corporation of Delaware Application December 2, 1957, Serial No. 700,123

13 Claims. (Cl. 74—335)

This invention relates to a remote control mechanism for a transmission and it relates particularly to apparatus in which manual movement of a selector device placed within convenient reach of an operator acts through a pressure fluid system to effect a corresponding and operator controlled movement of the transmission shift rods. While the apparatus is designed primarily for vehicular use, either over the road or off the road, it will be apparent that its use is not so limited but the device herein disclosed is adaptable to a variety of further uses.

There have for a long time been many uses, particularly in vehicular design, where it has been desirable to place a shift control device at a substantial distance from the transmission structure. For example, in many types of trucks and some busses the driver's compartment is mounted substantially over the engine. However, the transmission is necessarily located behind both the engine and the clutch and is therefore spaced appreciably from the driver's compartment. Further, in other types of constructions it has been desirable to place the transmission at the extreme rear of the vehicle, even though the driver's compartment remains at the forward end. The same has been true in many cases for various kinds of off-the-road equipment, particularly dirt moving equipment.

As is well known, the operator of a vehicle or other apparatus utilizing a manually shiftable transmission relies to a high degree upon the sound of the transmission, and other parts of the vehicle, in determining the proper time to make a shift. Thus, it is instinctive that when the toothed elements, such as gears or jaw clutches, which are to be engaged turn out on initial contact not to be running at the proper relative speeds to permit engagement but rather that they rake, the manual shifting movement is quickly reversed to move the toothed elements away from contact with each other. Since this is largely an instinctive reaction on the part of the driver, it must take place very quickly when the driver hears the parts rake or the driver will not consider the shift control to be adequate. Hence, it is necessary that there be provided an extremely exacting, and rapidly following, relationship between the manually operable control member and the power operated shiftable members, regardless of whether the shiftable members are being moved in an engaging or a disengaging direction with respect to each other.

Further, it is desirable that the pressure of the pressure fluid be of sufficient magnitude, and that its mode of application be such, that the interengageable parts will, in an engaging operation, be moved toward each other at a rate of speed faster than the difference between their rotational rates when they are at relative speeds in general close to synchronous speeds. Since this rate of moving has been successfully accomplished by normal hand movement of the shiftable members, although limited to relatively narrow ranges of relative speeds, it will be understood that an even better, quieter, more rake-free, and in general, a more satisfactory shift through wider ranges of relative speeds can be obtained if it is possible to move the interengageable parts into engagement with each other at a rate of speed materially faster than that normally obtained by hand shifting.

In the past, the remote control of the transmission required for these various uses has usually been supplied by mechanically operated devices which work reasonably effectively but are relatively inflexible. Particularly, the positions in which mechanical linkages are usable are somewhat limited, the linkages themselves may be clumsy to install, are often difficult to operate and are sometimes expensive to maintain in good operating condition.

The attempts which have thus far been made, so far as I am aware, for using pressure fluid remote control apparatus have employed types of apparatus which are relatively slow in their response at the transmission to changes imposed by the operator in the position of the selector or such apparatus has been of such complexity as to involve unreasonable expense in both the original installation and in its maintenance. Further, in closed system types of hydraulic devices, leakage of hydraulic fluid was inevitable without rigorous sealing, and if such sealing was provided then there would be such a drag on the relatively moving parts as to be unacceptable to the operator. Thus, the lag between the controlling and the controlled members, or the feeling of drag on the manually operated controlling member, which are both common in present devices of this nature, is not desirable and has thus far materially restricted their acceptance.

With respect to a gaseous type of pressure fluid it has been believed in the past by workers in this field that the use of such a pressure fluid could not be controlled with sufficient exactness to move the shiftable parts as required. Particularly, recognizing as above mentioned that it is necessary to move the shiftable parts toward each other at a relatively high rate of speed in order to effect a satisfactory interengagement thereof, it has been believed in the past that if sufficient pressure were applied to the shiftable parts to move them at an effective rate of speed, then the pressure would be sufficiently great that it could not be properly controlled and would effect raking or clashing of the interengaging means. Reducing the pressure sufficiently to reduce the raking or clashing to an acceptable level would, according to prior understanding, reduce to an ineffectively slow value the rate of movement of the interengageable parts toward each other. This has, accordingly, been considered to have presented an impossible situation and hence, insofar as I am aware, no serious attempts to use high pressure fluid, particularly a gaseous fluid, for this purpose have been previously undertaken.

A further and still more specific problem arises in that in the transmissions normally involved in the vehicles with which the present invention is concerned, there are usually utilized three or more shift rods. Thus, where a pressure responsive device, such as an air cylinder, is used for effecting movement of the shift rod engaging member transversely of the shift rods, in order to enable it to select and engage a desired shift rod, it is necessary for the pressure responsive device to be capable of moving the shift member to a precisely locatable point somewhere between its extreme limits of movement in order that the shift member may properly engage one of the middle shift rods. In other words, while the pressure responsive device may move merely to its end positions to enable the shift member to engage the two outside rods, its movement must be accurately controllable to points between its end limits to enable the shift member to locate and engage an intermediate rod. This is accomplished by providing a cylinder having such internal structure that pressure applied at different points thereto will cause the piston thereof to occupy variously predetermined positions in between the positions at each extreme end of the cylinder. Thus, by causing the selector apparatus to select an appropriate one of the pressure fluid supply means to said cylinder, the piston will take a definitely predetermined position and thereby cause the shift member to occupy a definite position transversely of the shift rods, which will result in the shift member engaging a definitely predetermined shift rod for causing longitudinal movement thereof.

Accordingly, a principal object of the invention has been to provide a remotely controlled transmission shifting device which incorporates a fluid energized power shift and which will have a wide versatility in its adaptability to different types of transmission apparatus and different types of vehicles.

A further object of the invention has been to provide a device, as aforesaid, which will utilize a pressure fluid, preferably gaseous and which will be rapid and accurate in its operation, including where the driver controlled device is separated from the transmission by a substantial distance, such as the entire length of a vehicle.

A further object of the invention has been to provide connecting means between a manually controllable shifting member and the interengageable members of a transmission which includes a gaseous fluid pressure power shifting device and yet which is of sufficient accuracy, precision and rapidity of response, yet without sacrificing durability, that the driver has the same precision of control over the shifting movement of the shiftable members in an engaging or disengaging direction with respect to each other as he would have if the gears were controlled by a conventional substantially straight, or other mechanically connected, shift lever.

A further object of the invention has been to provide a device, as aforesaid, in which a power operated shift member is moved both laterally and transversely with respect to the direction of movement of the shift rods and in which such lateral movement is effected and controlled by remotely controlled gaseous fluid pressure responsive means with such precision that it will be caused accurately to engage any selected one of a plurality of shift rods.

A further object of the invention has been to provide apparatus, as aforesaid, utilizing a gaseous pressure fluid for connecting the manually movable means with the transmission actuating means, wherein the pressure fluid so utilized is at a sufficiently high pressure, such as 80–120 p.s.i., to insure rapid and immediate following of the manually operable means by the pressure responsive means and yet permitting the use of the same pressure fluid in the pressure responsive means without subjecting such shiftable members to such rigorous treatment as to create unreasonable maintenance problems.

A further object of the invention has been to provide a device, as aforesaid, which is sufficiently simple in its construction that it will be relatively inexpensive to manufacture, install and maintain.

A further object of the invention has been to provide a device, as aforesaid, which is sufficiently durable in its construction that it will be relatively inexpensive to manufacture, install and maintain.

A further object of the invention has been to provide a device, as aforesaid, in which pressure fluid responsive cylinders are provided for controlling movement of shift levers or shift rods of the transmission and the supply of pressure fluid to such cylinders is in turn controlled by valving actuated by movement of a shift control device through a conventional shifting pattern.

Other objects and purposes of the invention will be apparent to persons acquainted with this type of apparatus upon reading the following disclosure and inspection of the accompanying drawings.

In the drawings:

Figure 2 is a sectional view substantially as taken along the line II—II of Figure 1.

Figure 3 is a sectional view taken along the line III—III of Figure 2 and including a bottom view of the transmitter.

Figure 4 is a broken sectional view taken along the line IV—IV of Figure 1.

Figure 5 is a sectional view taken along the line V—V of Figure 4.

Figure 6 is a sectional view taken along the line VI—VI of Figure 5 and rotated 90 degrees clockwise.

Figure 7 is a broken sectional view taken along the line VII—VII of Figure 6.

Figure 8 is a sectional view taken along the line VIII—VIII of Figure 5.

Figure 9 is a broken sectional view taken along the line IX—IX of Figure 4.

GENERAL DESCRIPTION

Figure 1:
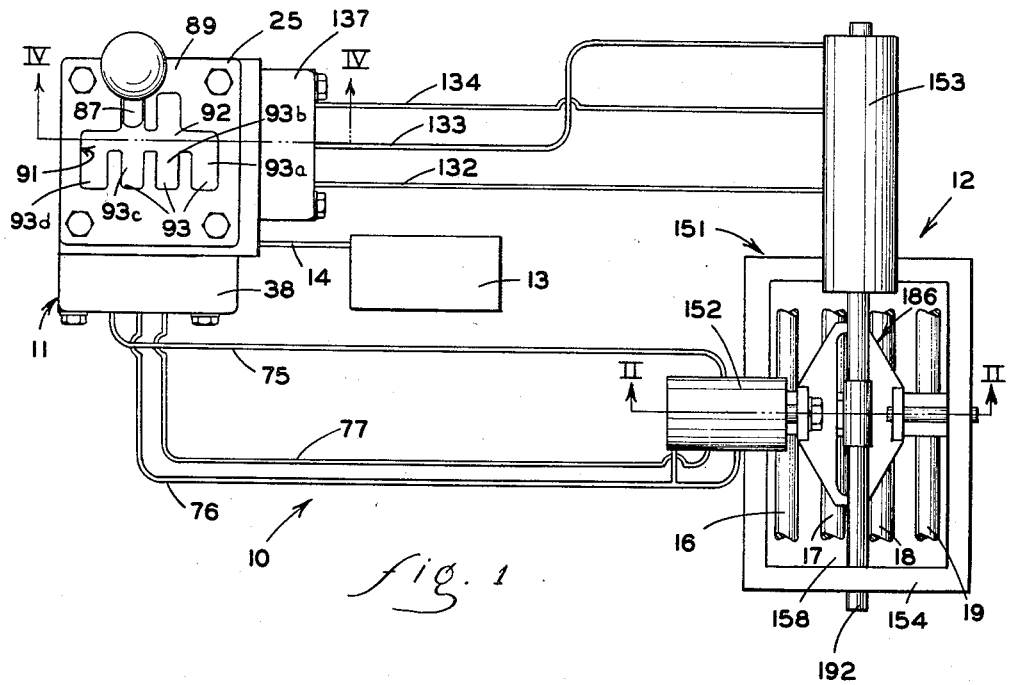
Figure 1 is a partially schematic, top plan view of an apparatus embodying the invention.

In general, apparatus suitably embodying the invention comprises a shift member and means supporting same for movement transversely of the shift rods whereby the member is adapted to engage a selected shift rod and thence is further adapted for movement longitudinally of the shift rod to move said shift rod for effecting a gear shifting function. More specifically, stepwise actuable pressure fluid responsive means are provided for moving the shift member transversely of the shift rods to engage a selected shift rod. Other pressure fluid means are provided for then moving the shift member in a direction axially of the shift rods for effecting the shifting function. A source of pressure fluid, preferably gaseous, is provided together with suitable conduits for connecting same through control valves to the pressure fluid responsive means. Said control valves are arranged adjacent manually movable selector means. Linkage is provided between the manually movable selector means and the valves of such character that movement of the selector means into certain predetermined positions will result in such actuation of said valves, and resulting actuation of the pressure fluid responsive means, that the shift member will move both transversely and longitudinally in a predetermined manner and effect the shift desired by the operator.

Further, said control valves are provided in such physical relationship to the manually movable means that the control valves are actuable by relatively small motion in either direction of the manually movable means. In this manner, if during a shifting operation the interengageable elements are not moving at such relative speeds as to enable them to mesh with each other, and they rake instead, the instinctive movement of the driver to move the shift lever away from shift effecting direction will be immediately translated to the shift rod for drawing the interengageable members away from each other. Thus, by providing an extremely rapid following of the manually controlled element by the shiftable elements, it becomes possible to use relatively high pressures for actuating the shiftable elements inasmuch as the driver can be relied upon, just as in the case of direct mechanical connection between the parts, to withdraw the control member immediately when a rake occurs and thereby move the interengageable elements away from each other. In this way, the use of high pressure does not endanger the interengageable elements.

While conceivably some of the principles of the invention could be utilized with hydraulic fluids, the invention is best carried out by the use of a gas, most conveniently air, as the pressure fluid and the description will proceed accordingly.

DETAILED CONSTRUCTION

In proceeding with the detailed description of the invention, it should be borne in mind that the embodiments selected for illustrating the invention are only representative of many by which the principles of the invention could conceivably, and entirely practicably, be placed in practice. Thus, while much of the invention lies in the specific mechanism by which said principles are placed into practical use, other and broader aspects of the invention lie in the basic operating principles of these mechanisms, which principles have not, insofar as I am aware, heretofore been either appreciated or utilized.

The control apparatus 10, as shown in Figures 1 and 3, and which has been selected to illustrate the invention, is comprised of a manually operable unit or transmitter 11 which is connected by a plurality of conduits to the remotely controlled unit or receiver 12. The transmitter 11 is connected to a source 13 of pressure fluid by the conduit 14 and the receiver 12 is operably associated with the shift rods 16, 17, 18 and 19 of a substantially conventional transmission, such as that disclosed and described in United States patent application Serial No. 551,056, entitled "Multi-Speed Lever Control Commission" and assigned to the assignee of this application. Such a transmission is indicated by broken lines at 21 in Figure 2. Inasmuch as the control apparatus 10 to which this invention relates is capable of use with any transmission having conventional types of shift rods requiring axial movement in order to effect a shift of the transmission, it is believed unnecessary to provide a detailed description of the transmission, which, as such, forms no part of this invention.

*Manually operable (transmitter) unit*

The transmitter 11 (Figures 1 and 5) is comprised of a housing 25, having a channel-shaped frame member 26 which is normally disposed, as shown in Figures 4 and 6, so that the web portion 27 (Figure 5) and the flange portions 28 and 29 are all substantially upright and perpendicular to the horizontal. The web 27 and flanges 28 and 29 are sufficiently thick that they can be provided with a plurality of passageways through which a pressure fluid can flow.

A selection control element 31 is comprised of a shaft 32 (Figures 5 and 6) which is pivotally supported in the exially horizontal openings 33 and 34 through the flanges 28 and 29, respectively, approximately midway between the upper and lower ends thereof. The rod selecting member 31 has a valve head 36 which is preferably integral with one end of the shaft 32 and disposed adjacent to the outer surface 37 of the flange 28 for snug and slidable engagement therewith. Said valve head 36 extends radially away from the axis of the shaft 32 and downwardly, as shown in Figure 6, in this particular embodiment. A cup-shaped cap member 38 is mounted upon the flange 28, as by the bolts 39, so that its rim 41 snugly engages the surface 37 of said flange 28 a sufficient distance from the valve head 36 that said valve head has ample room in which to move when the shaft 32 is pivoted in a manner described in detail hereinafter. The inner wall 42 snugly and pivotally engages a pivot button 43 on the adjacent surface of the valve head 36 for urging the opposite inner side 44 of the valve head snugly against the outer surface 37 of said flange 28.

The shaft 32 (Figures 5 and 6) has an annular groove 46 which is disposed between the inner and outer surfaces of the flange 28. Sealing means, such as the O-rings 47 and 48 are disposed within appropriate circular recesses on opposite sides of the annular groove 46 for the purpose of resisting the movement of fluid pressure away from the annular groove in a substantially conventional manner. A transverse opening 49 through the shaft 32 connects diametrically opposite portions of the annular groove 46.

The valve head 36 is provided with a pair of spaced, substantially identical recesses 51 and 52 (Figure 8) in the inner side 44 thereof, the axes of which are equidistance from the axis of the shaft 32. A circular insert seal 53 (Figures 6 and 8) having a central coaxial opening 54 is slidably disposed within each of the recesses 51 and 52 and resiliently urged by means of the spring 56 against the outer surface 37 of the flange 28. The recesses 51 and 52 are connected by a passageway 57 in the lower end of valve head 36, which passageway communicates with the opeinngs 54 in the seals 53. The transverse opening 49 in the shaft 32 is connected to said passageway 57 by means of a passageway 58 which is partially disposed within the shaft 32 and partially disposed within the valve head 36.

The outer surface 37 of the flange 28 is provided with three circular ports 60, 61, and 62 (Figure 7) which are spaced from each other and which are equi-distant from the axis of the shaft 32, such distance being equal to the distance of the axes of said recesses 51 and 52 from said shaft axis. Adjacent ones of the ports 60, 61 and 62 are spaced from each other a distance slightly greater than the diameter of the opening 54 and substantially equal in center line distance to the spacing between the recesses 51 and 52. Accordingly, the recesses 51 and 52, hence the openings 54, may be aligned with two of the ports 60, 61 and 62 at the same time, as shown in Figure 8. Also, as shown in Figure 8, said valve head 36 may be positioned so that just one of the recesses 51 and 52 is aligned with just one of the ports 60, 61 and 62. In this particular embodiment, there are four different positions of the valve head 36 with respect to the ports 60, 61 and 62. In the first position, the recess 52 is aligned with the port 60. In the second position, the recesses 51 and 52 are aligned with the ports 60 and 61, respectively. In the third position, recesses 51 and 52 are aligned with ports 61 and 62, respectively. In the fourth position, recess 51 is aligned with port 62 only. The purpose and significance of these positions will become apparent hereinafter.

A detent structure 64 (Figure 6) is comprised of a spherical detent 65 disposed within a detent opening 66 in the flange 28 adjacent to the valve head 36. Resilient means, such as the spring 67, urges the detent ball 65 continuously against the inside 44 of said head 36. Said inner side 44 is provided with a plurality of vertical grooves 68 (Figures 6 and 8) which are so arranged with respect to the recesses 51 and 52 and the pivotal axis of the valve head 36 that the detent element 65 will be disposed in one of said grooves 68 when the valve head 36 is in one of its said positions with respect to the ports 60, 61 and 62. The ports 60, 61 and 62 are connected to outlet openings 71, 72 and 73, respectively, into which the conduits 75, 76 and 77 are receivable in a substantially conventional manner (Figure 7). An inlet passageway 78 (Figures 5 and 7) extends through the flange 28 and communicates at one end with the annular groove 46 in the shaft 32 and at its other end with the conduit 14 for connection to the source 13.

The shaft 32 is provided with a flat portion 81 (Figures 4 and 5) between the ends thereof, which is slidably received between the legs 82 and 83 of the yoke 84, said yoke being pivotally supported upon said flat portion by means of the pivot bolt 86. A shift lever 87 is received into a suitable opening 88 in the upper end of the yoke 84 and extends upwardly therefrom, as shown in Figure 4. Accordingly, the lever 87 can effect rotation of the shaft 32 about its lengthwise axis while at the same time being capable of pivoting about the axis of the pivot bolt 86, substantially within a plane including the lengthwise axis of the shaft 32. A shaft guide plate 89 (Figures 1 and 4) having a shift guide opening 91, is mounted upon, and secured to, the upper edges of the flanges 28 and 29 and the web 27. The shift lever 87 extends through, and its movement is limited by, the walls of the shift guide opening 91. In this particular embodiment, the shift guide opening 91 has an elongated neutral zone 92 (Figure 1) which is disposed transversely of the axis of the shaft 32 and provides for pivoting of the shaft 32, hence the valve head 36. Said guide opening 91 also includes a plurality of shift recesses 93 which communicate with the neutral zone 92 and into which the shift lever 87 may be moved when it is pivoted about the pivot bolt 86.

The master unit 11 also includes a shift-selecting member 97 (Figure 5) which is comprised of a shaft 98, having an integral valve head 99 on one end of said shaft. The shaft 98 is rotatably supported within a shaft opening 101 in the web portion 27 of the frame member 26, the axis of which intersects with the axis of the shaft 32, and which is preferably horizontal. The valve head 99, like the valve head 36, is offset with respect to its shaft 98 and is disposed snugly adjacent to the outer surface 102 of the web portion 27. The shaft 98 has an annular groove 103 disposed entirely within the shaft opening 101 and flanked by a pair of sealing rings 104 and 105. The inner end of the shaft 98 is provided with a slot 106 adjacent to the flat portion 81 of the shaft 32. An actuating finger 108 which is secured to, and extends sidewardly from, the yoke 84 is slidably disposed at all times within the slot 106. The actuating finger 108 is pivotally supported upon the shift lever 87 directly above the yoke 84 where it is held by the snap ring 111. Such pivotal movement of the actuating finger 108 compensates for the fact that the pivot axis of the pivot bolt 86 will be at an angle to the rotational axis of the shaft 98 when the lever 87 is moved about said pivotal axis of the bolt 86 in effecting a shifting movement. Accordingly, pivotal movement of the lever 87 about the pivot bolt 86 will effect a rotation of the shaft 98 about its axis regardless of the rotational position of the shaft 32 within the limits imposed by the above mentioned four operational positions of the valve head 36.

The valve head 99 has a pair of recesses 109 and 110 in the inner side 112 thereof (Figure 9) which bears snugly against the outer surface 102 of the web portion 27. These recesses 109 and 110 are provided with sealing insert rings 113 (Figure 4) which may be substantially identical to the seal inserts 53 and which have coaxial openings 114. Three ports 116, 117 and 118 (Figure 9) open through the outer surface 102 of the web portion 27 and are axially alignable with one or both of the recesses 109 and 110 in a manner similar to that set forth with respect to the corresponding parts of the valve head 36. In this particular embodiment, there are three positions of the valve head 99 with respect to the ports 116, 117 and 118 as follows:

In the first position, the recess 110 is aligned with the port 116.

In the second position, the recesses 109 and 110 are aligned with the ports 116 and 117, respectively.

In the third position, the recesses 109 and 110 are axially aligned with the ports 117 and 118, respectively.

The web portion 27 is provided with a detent opening 119 (Figure 4) which communicates through the outer surface 102 and in which a detent element 121 is disposed. Resilient means, such as the spiral spring 122, urges the detent element 121, here a ball, against the inner side 112 of the valve head 99. Three spaced recesses, 123, are disposed upon the inner side 112 of the valve head 99 for engagement with the detent element 121 when said valve head 99 is in one of its above mentioned three positions with relationship to the ports 116, 117 and 118.

The recesses 109 and 110 are interconnected by a passageway 124 within the valve head 99. Diametrically opposite portions of the annular groove 103 in the shaft 98 are connected by an opening 126 (Figure 4). A passageway 127 connects the opening 126 with the passageway 124.

The ports 116, 117 and 118 are connected to outlet openings 128, 129 and 130, respectively (Figure 9), which in turn communicate with the conduits 132, 133 and 134, respectively. The inlet passageway 78 is connected to the annular groove 103 (Figure 5) by means of a passageway 136, thereby connecting said groove 103 to the source 13 through the conduit 14 (Figure 1). The valve head 99 is covered by the cap member 137, having a rim 138 which snugly engages the outer surface 102 of the web portion 27 around said valve head 99, there being adequate space within said cap member for said valve head 99 to move freely into any one of its above mentioned three positions. A pivot button 139 on the outer surface of the valve head 99 pivotally engages the inner wall 141 of the cap member 137, whereby said valve head 99 is held with its inner side 112 snugly but slidably against the outer surface 102 of the web portion 27.

*Remotely controlled (receiver) unit*

As shown in Figures 1, 2 and 3, the receiver unit 12 has a housing structure 151 and includes the selector assembly 152 and the shift assembly 153. The housing structure includes a rectangular frame 154 disposed at the junction of the selector and the shift assemblies. The selector assembly 152 includes a cylindrical piston chamber 156 (Figures 2 and 3) through which a coaxial piston rod 157 slidably extends, the inner end of said piston rod being disposed within the rectangular frame 154, said piston rod 157 penetrating into the zone 158 defined by the frame 154. The piston chamber 156 has a central portion 159 of reduced diameter in which the fixed piston 161 is axially slidably disposed. Said fixed piston 161 is secured to the piston rod 157 by any convenient means, such as snap rings 162 and 163 at opposite ends of said piston 161. A sealing ring 164 provides a seal between the annular adjacent surfaces of the piston 161 and the walls defining the central portion 159.

An outer piston 166 is slidably mounted upon the piston rod 157 between the fixed piston 161 and the outer end wall 167 of the chamber 156. Suitable sealing rings 168 and 169 provide pressure fluid seals between the outer piston 166 and the piston rod 157 and between the outer piston 166 and the wall of the piston chamber 156 within the outer (leftward in Figure 2) end portion of said chamber 156, respectively. An inner floating piston 172 is slidably mounted upon the piston rod 157 between the fixed piston 161 and the inner end wall 173. Suitable sealing means such as the sealing rings 174 and 176 prevent the escape of pressure fluid between the inner piston 172 and, respectively, either the piston rod 157 or the adjacent portion of the wall of the piston chamber 156. Due to the reduced size of the central portion 159 of the piston chamber 156, shoulders 178 and 179 are provided at the outer and inner ends, respectively, thereof. Thus, movement of the floating pistons 166 and 172 is limited between the adjacent end walls 167 and 173, respectively, and the shoulders 178 and 179, respectively. The length of the fixed piston 161 is less than the axial length of the central portion 159, thereby permitting movement of said fixed piston between, and with respect, to the floating pistons, when said floating pistons are against their corresponding shoulders 178 and 179. An inlet port 181 (Figure 3) communicates with the outer end 171 of the piston chamber 156 adjacent to the outer end wall 167. An inlet port 182 communicates with the inner end 177 of the piston chamber 156 adjacent to the inner end wall 173. A pair of inlet ports 183 and 184 communicate with the outer and inner ends, respectively, of the central portion 159 of the piston chamber 156. The inlet ports 181 and 182 are both connected to the conduit 76 (Figure 1). The inlet ports 183 and 184 are connected to the conduits 77 and 75, respectively.

A selector plate 186 is disposed within the zone 158 in the frame 154 and is supported at its leftward (Figure 3) side on and by the inner end of the piston rod 157. The opposite side of said plate 186 is slidably supported upon a guide rod 187 which is coaxial with the piston rod 157 and mounted upon the frame 154. The selector plate 186 is provided with an elongated slot 188, the lengthwise extent of which is perpendicular to the axis of the piston rod 157. Movement of the piston rod 157 effects a movement of the selector plate 186 in a direction transversely of said slot 188.

The shift assembly 153 includes a cylindrical piston chamber 191 through which the piston rod 192 is coaxially received, said piston rod 192 extending completely through the zone 158 within the frame 154. A fixed piston 193 is secured upon the piston rod 192 between the snap rings 194 and 196 for axially slidable movement within the inner portion 197 of the piston chamber 191. The inner portion 197 is of reduced diameter, thereby providing a shoulder 195 at its outer end. Sealing rings 198 and 199 prevent the passage of pressure fluid along the external and internal surfaces, respectively, of the fixed piston 193. A floating piston 201 is slidably supported upon the piston rod 192 within the enlarged outer portion 202 of the chamber 191. Sealing rings 203 and 204 prevent the escape of pressure fluid along the outer and inner surfaces, respectively, of the floating piston 201. An inlet port 206 communicates with the inner portion 197 of the piston chamber 191 adjacent to the inner end thereof and an inlet port 208 communicates with said inner portion 197 adjacent to the outer end thereof. An inlet port 207 communicates with the outer portion 202 of said piston chamber 191 adjacent to the outer end thereof.

A shift rod actuator 211 is pivotally supported upon the piston rod 192 between the snap rings 212 and 213 and within the zone 158 defined by the frame 154. The actuator 211 has a finger 214 which extends downwardly through the zone 158 (Figure 2) and through the slot 188 in the selector plate 186 for engagement with one of the shift yokes 216, 217, 218 and 219, mounted upon, and movable with, the shift rods 16, 17, 18 and 19, respectively. Thus, the particular shift yoke with which said finger 214 is engaged will depend upon the position of the selector plate 186, which will depend upon the location of the piston rod 157. A shifting movement of a particular shift yoke, hence of the shift rod associated therewith, is effected by an axial movement of the piston rod 192, such movement being effected without changing the position of the selector plate 186 because of the slot 188 through which the shift finger 214 extends. The inlet ports 206, 207 and 208 are connected to the conduits 132, 133 and 134, respectively.

Although the selecting members 31 and 97 (Figure 5) are specifically set forth as the rod selecting and shift direction selecting members, respectively, it will be recognized that this arrangement can be reversed, if desired, by reversing the location of the valve heads 36 and 99, as well as the arrangement of the ports in the frame member 26 associated therewith.

It should be particularly noted that the arrangement of the ports 60, 61 and 62 (Figure 7) and the ports 116, 117 and 118 (Figure 9) together with their respectively connecting conduits, is such as to facilitate the placement of said ports very close together and such placement is in fact made as close together as can be accomplished within the limits of proper strength and other structural characteristics. This, as will be developed in more detail hereinafter, is advantageous in the effecting of rapid and accurate control relationship between the manually actuated selector and the power actuated shift mechanism.

*Operation*

For convenience in describing the opertion of the control apparatus 10 shown in Figure 1, the disclosure of such operation will commence with the shift lever 87 of the master unit 11 in neutral position. In such case, the lever 87 will extend through the neutral zone 92 of the shift guide opening 91 in the shift guide plate 89 on said master unit 11. Said shift lever 87 may be moved anywhere along the neutral space 92 by pivoting the shift lever 87 and the shaft 32 about the axis of the said shaft 32. Such change in the position of the shift lever 87 within the neutral space 92 and consequent rotation of the shaft 32 will be accomplished by a corresponding movement of the valve head 36 which is also secured to said shaft 32. Movement of the valve head 36 about the axis of the shaft 32 causes the recesses 51 and 52, hence the valve inserts 53, to sweep across the adjacent outer surface 37 of the flange 28 into and out of alignment successively with the ports 60, 61 and 62 therein. Because of the interconnection between the ports 60, 61 and 62 and the various portions of the selector piston chamber 156, fluid pressure passing from the source 13 through the rod selecting member 31 and the appropriate conduits 75, 76 and 77 to the selector assembly 152, will result in a corresponding movement of the shift rod actuator 211 (Figure 2) transversely of the shift rods 16, 17, 18 and 19 and a selection by the actuator 211 of a desired one of them as hereinafter set forth in detail.

Where, as in this particular embodiment, there are four shift rods, which must be operated in order to effect a proper operation of the transmission 21 (Figure 2) associated therewith, then it is essential, as stated hereinabove, that there be four separate, identifiable positions of the valve head 36 for producing corresponding positions of the shift rod actuator 211, whereby operable association of said shift rod actuator with the shift yokes 216, 217, 218 and 219 may be effected, one at a time. Location of the proper one, or desired one, of the four positions is controlled both by the shift guide opening and the detent structure 64. That is, the lever 87 is visually aligned with the desired shift recess 93 into which the shift lever 87 will be moved out of the neutral position and the detent structure 64 will then automatically locate the valve head 36, hence the lever 87, exactly in line with such recess. The action of the detent structure 64 will be strong enough to be perceptible by any normal person manually operating the lever 87 but not strong enough to interfere with the relatively free movement of the lever in the neutral zone 92.

Now examining more closely a typical shifting operation, the shift procedure from neutral into a selected gear will be traced. For commencing this, the shift lever knob 87 will be moved in the proper direction, as rightwardly (Figure 1), thereby pivoting said shift lever clockwise about the axis of the shaft 32 (Figure 4) until the valve head 36 assumes the solid line, first position shown in Figure 8. The detent element 65 will then be disposed within the rightwardmost of the grooves 68 in the inner side 44 of said valve head 36. The opening 54 in the valve insert 53 will be aligned with the port 60. Accordingly, pressure fluid will flow from the source 13 (Figure 1) through the conduit 14 and the inlet passageway 78 (Figure 7) into the annular groove 46 (Figures 5 and 7) in the shaft 32. Such pressure fluid will then flow from the groove 46 through the transverse opening 49 (Figure 6) and passageways 58 and 57 and will then pass through the valve insert 53 in the recess 52 to the port 60 (Figure 8) in the flange 28. Such pressure fluid will then pass into the outlet opening 71 (Figure 7) and the conduit 75 to the port 184 (Figure 3) in the selector assembly 152, which port 184 communicates with the inner end of the central portion 159 of the piston chamber 156. Accordingly, the pressure fluid enters the piston chamber 156 between the sealing rings 176 and 164 on the floating piston 172 and fixed piston 161, respectively. This causes the floating piston 172 to move rightwardly against the inner end wall 173 of the piston chamber 156 and causes the fixed piston 161 to move leftwardly against the outer piston 166 until said outer piston is driven against the outer end wall 167. Inasmuch as the fixed piston 161 is secured with respect to the piston rod 157, such outward movement of the fixed piston 161 results in a corresponding movement of the piston rod 157, and in turn, a corresponding movement of the selector plate 186 which is secured to the inner end of said piston rod 157 (Figure 3). Such movement of the selector plate 186, the finger 214 being pivotally supported on the rod 192, will cause said finger 214 to pivot on the rod 192 and thus move into operable position with respect to the shift yoke 216 associated with the shift rod 16, where it will remain unless and until the shift lever 87 is again in the neutral zone 92. The master unit 11 is now in condition for permitting a shifting movement of the shift lever 87 into the shift recess 93a adjacent to said lever.

When it becomes desirable to effect a shifting motion of the shift rod 19, the shift lever 87 is moved into the recess 93a, thereby pivotally moving the shift lever 87 about the pivot axis of the pivot bolt 86, such movement of the lever 87 operates through the actuating finger 108 to effect a rotation of the shaft 98 of the shift selecting member 97. Thus, movement of the lever 87 into the shift recess 93a causes the valve head 99 (Figures 4 and 9) to move into its broken line position 99a, as shown in Figure 9, where the openings 114 in the insert rings 113 will be aligned with the ports 117 and 118. Accordingly, pressure fluid will be able to flow from the source 13 (Figure 1) through the conduit 14, the inlet passageway 78, the passageway 136, the annular groove 103, the opening 126, the passageway 127, and through the valve insert rings 113 to the ports 117 and 118, respectively. The pressure fluid then flows through the outlet openings 129 and 130 to the conduits 133 and 134, respectively, and thence to the ports 207 and 208 in the shift assembly 153 (Figure 3). Pressure fluid entering through the ports 207 and 208 into the piston chamber 191 will be on opposite sides of the floating piston 201 and the fluid entering through port 207 will be between the sealing elements encircling the fixed piston 193 and the floating piston 201. Because the diameter of the floating piston 201 is greater on its outer surface than its inner surface, the fluid pressure entering through port 207 will prevail and thereby urge the floating piston to move inwardly until it engages the shoulder 195 in the piston chamber 191, following which further movement inwardly by the fixed piston 193 and the piston rod 192 will be effected by the pressure fluid entering through the port 208. Thus, the fixed piston 193 and the piston rod 192 will be moved to their inwardmost position. Accordingly, the shift rod actuator 211 will be moved with the piston rod 192 in a corresponding direction, thereby effecting a shift of the shift yoke 219 and of shift rod 19 associated therewith.

When the operator wishes to move the shift rod 19 out of its shifted position, such is accomplished by moving the shift lever 87 back into the neutral zone 92 and thereby rotating the shift selecting member 97 into a position so that the passageway 124 in the valve head 99 will be connected to the ports 116 and 117 in the web portion 27. The detent element 121 will move into the center one of the detent recesses 123 when such alignment is effected. Pressure fluid will now pass from the source 13 (Figure 1) through the conduit 14 and the inlet passageway 78 thence through the passageways 126 and 127 to the passageway 124 (Figure 9) after which the pressure fluid will flow through the conduits 132 and 133 into the opposite ends of the piston chamber 191. Inasmuch as the outer surface of the floating piston 201 is larger than the inner surface of the fixed piston 193, the floating piston 201 will be held against the shoulder 195 and the pressure fluid entering through the port 206 will move the fixed piston 193 outwardly only until it engages the floating piston 201. However, such movement effecting a corresponding movement of the piston rod 192 will move the shift rod actuator 211 back into its neutral position with a corresponding movement of the shift yoke 219, and the shift rod 19 associated therewith.

The shift lever 87 can now be moved into approximate alignment with any one of the other shift recesses 93 extending out of the neutral zone 92 in said shift guide opening 91 preparatory to effecting a further shifting movement of said lever 87 in substantially the same manner as set forth hereinabove with respect to the movement of said shift lever into the shift recess 93a and the other movements of the mechanism resulting therefrom.

In each such instance, the movement of the shift lever 87 in the neutral zone 92 will be accompanied by a corresponding positive movement of the valve head 36 along the outer surface 37 of the flange 28. When the lever 87 is positioned with respect to a particular shift recess 93, said valve head 36 will be operably aligned with the proper one or more of the ports 60, 61 and 62. Accordingly, fluid pressure from the source 13 will be directed by said valve head 36 into the proper ones of the conduits 75, 76 and 77 and thence into the selector assembly 152, whereby the piston rod 157 is moved with respect to the piston chamber 156 to effect a proper positioning of the shift rod actuator 211 in a manner set forth above. The shift lever 87 is then moved into the adjacent shift recess 93, thereby effecting a corresponding movement of the valve head 99 followed by a corresponding operation of the shift assembly 153 in the manner set forth above.

More specifically, when the shift lever 87 is moved into alignment with the recess 93b, pressure fluid will continue to move as above described into the passageway 57 but will then be conducted to both of the ports 60 and 61 and to the conduits 75 and 76, respectively. This continues to pressurize the space between the fixed piston 161 and the inward movable piston 172 but also pressurizes the space to the left of the outer movable piston 166. The area of the piston 166 being larger than that of piston 161, the piston 166 will move rightwardly against the shoulder 178 (Figure 2) but in view of the pressure at the right of the fixed piston 161, said fixed piston will remain against the movable piston 166. This will effect movement of the rod 157 one increment rightwardly and cause the finger 214 to engage the shift yoke 217 and thereby be in position to move the shift rod 17.

Movement of the shift lever to the next stop leftwardly in alignment with the recess 93c will move the valve head 36 so that the openings 54 (Figure 8) are in alignment with the ports 61 and 62 and will thereby pressurize the lines 76 and 77. This moves the inward movable piston 172 against the shoulder 179 (Figure 2) and moves the fixed piston 161 rightwardly against said movable piston. This moves the plate 186 one more increment rightwardly and moves the finger 214 into engagement with the yoke 218 for movement of the rod 18.

Final movement of the shift member 87 leftwardly into alignment with the recess 93d will effect connection of the passageway 58 with only the port 62 and thereby pressurize only the conduit 77. This pressurizes only the leftward end of the fixed piston 161 and hence moves the rod 157 its full distance rightwardly and thereby moves the plate 186 the full distance rightwardly into the position shown in Figure 2.

Thus, it will be seen that movement of the shift lever into alignment with the several recesses 93 will effectively cause engagement by the finger 214 with a selected one of the shift yokes 216 to 219, inclusive.

Movement of the shift lever 87 about the axis of the shaft 98, regardless of its position with respect to the axis of the shaft 32, will pivot the valve head 99 into a selected one of three positions. In the position shown in the drawings (Figures 1 and 9), which may for convenience be referred to as forwardly, pressure fluid entering into the control unit through the conduit 14 and the passageway 78 will pass through the passageway 136 (Figure 5), through the groove 103 then through the passageway 127 (Figure 4), through the passageways 127 and 124 to the openings 114 (Figure 9), thereby pressurizing the conduit 132 which introduces pressure fluid into the inner end of the cylinder 202 and thereby urges the piston 193 into its extreme outward position. This moves the rod 192 in its extreme outward position and correspondingly moves whichever of the shift rods 16 to 19, inclusive, is engaged by the finger 214.

Movement of the lever 87 into its neutral, or middle, position moves the valve head 99 so that the openings 114 communicate with the ports 116 and 117 and thereby pressurize both of the conduits 132 and 133. This provides pressure on the outward side of the movable piston 201 which urges it against the shoulder 195 and also provides pressure on the inner side of the fixed piston 193 which urges it outwardly against the movable piston 201. This brings the rod 192 into its neutral position and correspondingly brings into neutral position whichever of the shift rods is engaged by the finger 214.

Movement of shift lever 87 into its opposite, or rearward, shifted position causes the movement of valve head 99 so that the openings 114 connect with the ports 117 and 118 and thereby pressurize the conduits 133 and 134. This holds the movable piston 201 against the shoulder 195, resulting from the larger diameter of the movable piston with respect to the fixed piston, and also pressurizes the space between the sealing members 198 and 203. This moves the fixed piston to its innermost position and thereby acts through the rod 192 to move correspondingly whichever shift rod is engaged by the finger 214.

It will be observed that the full pressure from the source 13 is applied to the system and this results in extremely rapid response of the shifting mechanism to the movement of the control lever 87. However, experience with the control unit herein disclosed shows that the use of full line pressure does not result in unreasonably severe treatment of the shift rods or the parts associated therewith and it is not unduly severe on the gearing in the shiftable mechanism being controlled or on the synchronizing structure or blocking structure, if any, which may be used. The reason for this appears to be at least partly in the throttling action resulting when pressure fluid from a conduit, such as the conduit 134, enters into a chamber, such as the chamber 202, which is of materially larger diameter than the conduit. Thus, the pressure momentarily drops. Inasmuch as the piston against which the pressure fluid works will move as soon as the pressure builds up to a level sufficient that it will overcome whatever frictional, or other resistance, effects are present, the actual movement of the piston will be under a pressure materially less than the line pressure. Nevertheless, since the pressure within any of the cylinders in question will build up very rapidly, the pressure will very quickly come up to whatever level is required to effect the desired movement and the response will be correspondingly rapid. Thus, the driver's control over the shiftable members is as positive, accurate and rapid by apparatus embodying the principles of the present invention as where a direct mechanical control is utilized and yet without subjecting the interengaging parts to any more risk of damage by ranking or clashing than in the case of direct mechanically connected controlling and controlled parts.

Because the receiver unit 12 thus closely and immediately follows each direction from the master unit 11, accurate, positive and effective shifts of the shift rods 16, 17, 18 and 19 can be effected even where the receiver unit 12 is spaced a very considerable distance from the master unit 11, as in excess of 10 or 12 feet.

Further, it will be understood in view of the foregoing description, that the close spacing of the several ports 60, 61 and 62 in the one group, and 116, 117 and 118, in the other group, is facilitated by the converging arrangement of the conduits connected therewith and further that the overall valve structure utilized is such as makes possible actuation of the pressure fluid system by only relatively small movements of the shift lever 87.

While a number of specific dimensional relationships are possible, it will be observed from an inspection of the drawings that the spacing between said ports is approximately only slightly greater than a distance equal to the diameter of the ports themselves.

Thus, as the shift lever is moved about the axis of the shaft 98 for advancing whichever of the shift rods is at the moment engaged by the finger 214, and if a clash of the engageable tooth element occurs, instinctive withdrawal of the shift lever 87 by the operator will effect a corresponding and immediate withdrawal of the engaged shift rod. Thus, the operator's instinctive reaction to the clashing of shiftable elements, followed at once by the immediate responsive of the equipment thereto, will give the operator virtually the same precision and control in the manual handling of the apparatus as would be available to him by a conventional mechanical shift lever engaging the gears directly under the shift lever. This effects the desired accuracy and precision of control while permitting the use of a sufficiently high pressure in the pressure fluid to effect a rapid response to movement of the shift lever 87 and also while permitting the control unit and the controlled unit to be separated from each other by a substantial distance.

Figure 10:
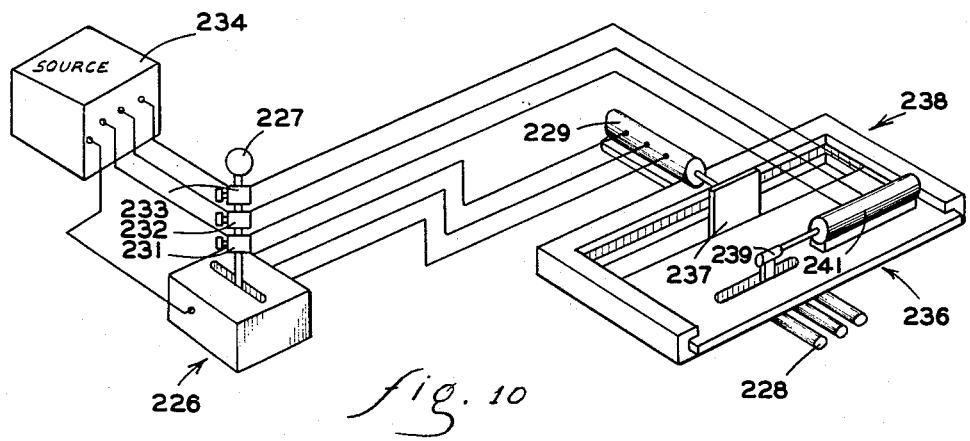
Figure 10 is an oblique, partially schematic showing of an alternate apparatus characterising the invention.

As shown in Figure 10, a master unit 226 may be provided with a shift lever 227 which is pivoted about one axis only. Accordingly, only one rotary valve head, such as the valve head 99, will be necessary within said master unit and, as in the case of the valve head 99, it may be utilized for effecting the shifting movement of the shift rods 228 by a shift actuator cylinder 229. The selecting function in this embodiment is accomplished by means of three manually operable selector valves 231, 232 and 233, mounted upon the shift lever 227 adjacent to the upper end thereof where they can be easily reached and operated by the person operating shift lever 227. Said selector valves 231, 232 and 233 are relay valves connected in turn to a source 234 of pressure fluid.

In this particular embodiment, the entire selector assembly 236 is moved by, and reciprocably supported upon, the shift assembly 237, which two assemblies constitute the slave unit 238. Accordingly, the shift selector 239 is moved in a linear direction by the selector cylinder 241 when selecting the proper shift rod, instead of being pivoted as in the shift actuator 211.

While the foregoing illustrated and described embodiment has been designed, and is best adapted, for use with a positive pressure of the line pressure normally available in heavy duty vehicles, such as from 80 to 120 p.s.i., and such high pressure is preferred to obtain the most compact design of the apparatus, it will be recognized that certain principles of the invention are adaptable for use with other and lower pressures and some of the principles may even be capable of limited application at the relatively low differentials obtainable by vacuum. However, it should be emphasized that the use of lower pressure differentials will result in loss of many of the advantages of the present invention and such uses, where appropriate at all, are of definitely limited character.

Although particular preferred embodiments of the invention have been disclosed hereinabove for illustrative purposes, it will be understood that variations or modifications of such disclosures which do not depart from the scope of the appended claims, are fully contemplated.

What is claimed is:

1. A fluid pressure operated transmission shifting structure for use on a vehicle having a source of fluid pressure and wherein shifting of the transmission is controlled by a plurality of aligned, parallel, movable shift rods, comprising: fluid pressure operated selecting means adjacent said shift rods for selecting a shift rod to be shifted; fluid pressure operated shifting means for shifting said shift rods; a selector unit for actuating said selecting means and said shifting means, said selector unit including a manually operable selector; guide means guiding movement of said selector, said guide means having an elongated passage and a plurality of recesses communicating with and extending perpendicular to said passage; a first, pivotally mounted valve actuator connected to said selector for being pivoted in response to lengthwise movement thereof in said passage; first valve connected for being actuated by pivotal movement of said first valve actuator, said first valve having a plurality of outlet ports; conduits connecting said outlet ports directly to said selecting means so that said selecting means is operated to select a shift rod when said selector is in said passage and is aligned with one of said recesses and selected ones of said outlet ports are pressurized; a second valve actuator connected to said selector for being moved in response to movement of said selector into said recesses; a second valve connected for being actuated by movement of said second valve actuator, said second valve means having a plurality of outlet ports; conduits connecting said last-mentioned output ports to said shifting means so that said shifting means is operated to shift a shift rod when said selector is moved into one of said recesses and selected ones of said last-mentioned outlet ports are pressurized.

2. A fluid pressure operated transmission shifting structure according to claim 1 wherein said recesses extend in opposite directions from said passage and said second valve actuator is movable between three positions corresponding to the positions occupied by said selector when same is in said passage or is in a recess on either side thereof; said second valve means being connected to said shifting means for placing the shift rod engaged thereby in neutral or in shifted position on either side of neutral in response to the position of said second valve actuator.

3. A fluid pressure operated transmission shifting structure wherein shifting of the transmission is controlled by a plurality of aligned, parallel, movable shift rods, comprising: shift rod engaging means; a fluid pressure operated selecting cylinder and actuator means connected to said shift rod engaging means and movable in response to pressurizing of said cylinder for moving same into engagement with said shift rods one at a time; at least three conduits communicating with said selecting cylinder at axially spaced points therealong and operative to pressurize said selecting cylinder to move said actuator means whereby said shift rod engaging means is placed in engagement with one of said shift rods at a time; a fluid pressure operated shifting cylinder and means extending from said shifting cylinder and movable in response to pressurizing thereof and being connected to said shift rod engaging means for causing longitudinal movement thereof between neutral and shifted positions; at least three conduits communicating with said shifting cylinder at axially spaced points therealong and operative to pressurize said shifting cylinder to move said last-named means to selected positions whereby said shift rod engaging means is placed in neutral or shifted positions; first valve means communicating directly and without obstruction with said selecting cylinder conduits for controlling pressurizing thereof; second valve means communicating directly and without obstruction with said shifting cylinder conduits for controlling pressurizing thereof; a manually operable selector movable through an elongated passage into recesses offset transversely therefrom and located on either side thereof; a first valve actuator connected to said selector and to said first valve means for moving same in response to movement of said selector in said passage and into alignment with said recesses to cause said first valve means to immediately and directly pressurize selected ones of said selector cylinder conduits so as to immediately move said shift rod engaging means into engagement with one or another of the shift rods; a second valve actuator connected to said selector and to said second valve means for moving same immediately and directly in response to movement of said selector into said recesses to cause said second valve means to pressurize selected ones of said shift cylinder conduits to thereby cause longitudinal shifting movement of said shift rod engaging means.

4. A fluid pressure operated transmission shifting structure wherein shifting of the transmission is controlled by a plurality of aligned, parallel, movable shift rods, comprising: shift rod engaging means; a fluid pressure operated selecting cylinder and piston means slidable within said cylinder; a piston rod extending from said cylinder and movable in response to pressurizing of same and movement of said piston means therewith and connected to said shift rod engaging means for moving same into engagement with said shift rods one at a time; at least three conduits communicating with said selecting cylinder at axially spaced points therealong and operative to pressurize said selecting cylinder to move said piston means to selected positions therewithin whereby said shift rod engaging means is placed in engagement with one of said shift rods at a time; a fluid pressure operated shifting cylinder and piston means slidable within said shifting cylinder; a piston rod extending from said shifting cylinder and movable in response to movement of said piston means therewithin, said last-named piston rod being connected to said shift rod engaging means for causing longitudinal movement thereof between neutral and shifted positions; at least three conduits communicating with said shifting cylinder at axially spaced points therealong and operative to pressurize said shifting cylinder to move said last-named piston means to selected positions therewithin whereby said shift rod engaging means is placed in neutral or shifted positions; first valve means communicating directly and without obstruction with said selecting cylinder conduits for controlling pressurizing therof; second valve means communicating directly and without obstruction with said shifting cylinder conduits for controlling pressurizing thereof; a manually operable selector movable through an elongated passage into recesses offset transversely therefrom and located on either side thereof; a first valve actuator connected to said selector and to said first valve means, said first valve actuator being movable in response to movement of said selector in said passage and being operative to so position said first valve means as to immediately pressurize selected ones of said selector cylinder conduits when said selector is in alignment with one of said recesses at a time and thereby immediately move said piston means in said selecting cylinder to a position where shift rod engaging means is placed in engagement with one or another of the shift rods; a second valve actuator connected to said selector and to said second valve means, said second valve actuator being movable in response to movement of said selector into said recesses and being operative to so position said second valve means as to immediately pressurize selected ones of said shift cylinder conduits when said selector is in one of said recesses and thereby move said piston means in said shifting cylinder to a position where said shift rod engaging means is in a shifted position whereby the position of said shift rod engaging means is directly and immediately responsive to the position of said selector.

5. A fluid pressure operated shifting structure according to claim 4 wherein said piston means within said shifting cylinder is movable only in response to fluid pressure within said conduits so that said piston means will move immediately in response to pressurizing of said conduits and will remain in whatever position it is placed until different ones of the conduits are pressurized.

6. A fluid pressure operated shifting structure according to claim 4 wherein at least four shift rods are provided and at least four conduits communicate with said selecting cylinder at axially spaced points therealong so that upon pressurizing of selected one of said conduits said shift rod engaging means will be moved into engagement with said shift rods, one at a time; said recesses corresponding in number to the number of shift rods and extending transversely from said passage at spaced points therealong so that said first valve means is actuated to supply fluid pressure to selected ones of said conduits to cause selection of a shift rod when said selector is moved into alignment with each of said recesses.

7. A fluid pressure operated shifting structure according to claim 6 wherein said piston means within said selecting cylinder is movable only in response to fluid pressure within said conduits so that said piston means will move immediately in response to pressurizing of said conduits and will remain in whatever position it is placed until different ones of the conduits are pressurized.

8. A fluid pressure operated shifting structure according to claim 4 wherein said piston means in said cylinders each include a plurality of separate pistons which are moved only by fluid pressure within the respective conduits so that said pistons will move immediately in response to pressurizing of selected ones of said conduits and remain in whatever position they are placed until different ones of the conduits are pressurized.

9. A fluid pressure operated transmission shifting structure wherein shifting of the transmission is controlled by a plurality of aligned, parallel, movable shift rods, comprising: shift rod engaging means; fluid pressure operated selecting means for moving said shift rod engaging means laterally of the shift rods to move same into engagement with a selected shift rod; fluid pressure operated shifting means for moving said shift rod engaging means longitudinally of the shift rods to establish a gear ratio of the transmission; a manually movable selector movable longitudinally through an elongated passageway and laterally into recesses offset from said passageway; a first valve including a movable valve element and a plurality of outlet ports and conduits connecting said outlet ports directly and without obstruction to said selecting means so that upon pressurizing of selected ones of said conduits, said selecting means is immediately pressurized to cause selection of a shift rod, said movable valve element being connected to said selector and being movable in response to longitudinal movement of said selector for connecting selected ones of said output ports to a fluid pressure source and thereby pressurizing selected ones of said conduits to cause selection of a shift rod when said selector is in alignment with each of said recesses; a second valve including a movable valve element and a plurality of outlet ports and conduits connecting said outlet ports directly and without obstruction to said shifting means so that upon pressurizing of selected ones of said last-named conduits, said shifting means is immediately pressurized to cause shifting of a shift rod, said movable valve element of said second valve being connected to said selector and being movable in response to lateral movement thereof for connecting selected ones of said output ports to a fluid pressure source and thereby pressurizing selected ones of said last-named conduits to cause shifting of the selected shift rod when said selector is in one of said recesses, whereby when said selector is in said passageway said shift rods are in neutral and when said selector is moved into a recess on either side of said passageway a shift rod is immediately shifted, the parts being so arranged that the conduits connected to the selecting and shifting means will immediately be pressurized in response to movement of said selector and said selecting and shifting means thereby will be positioned to cause selection and shifting of a shift rod, whereby the position of said shift rod engaging means is directly and immediately responsive to the position of said selector.

10. A fluid pressure operated transmission shifting structure according to claim 9 wherein said movable valve element of said second valve is mounted for pivotal movement in a plane substantially transverse to the lengthwise extent of said passageway and parallel with the lateral movement of said selector, said movable valve element of said second valve being connected to said selector for lateral movement therewith, the outlet ports of said second valve being closely spaced from each other so that when said selector is moved from said passageway into a recess or vice versa, the connection of the fluid pressure source will be switched from one set of ports to another to cause an immediate longitudinal movement of said shift rod.

11. A fluid pressure operated transmission shifting structure according to claim 9 wherein said movable valve element of said first valve is mounted for pivotal movement in a plane substantially parallel with the lengthwise extent of said passageway and said selector is connected to said valve element for pivoting same in response to longitudinal movement of said selector in said passageway, the outlet ports of said first valve being closely spaced from each other so that when said selector is moved from alignment with one recess into alignment with an other recess, the connection of the fluid pressure source will be switched from one set of outlet ports to another to cause an immediate change in the shift rod engaged by said shift rod engaging means.

12. A fluid pressure operated tranmission shifting structure according to claim 11 including detent means for releasably holding said valve element of said first valve in positions corresponding to the position of said selector when it is aligned with the respective recesses.

13. A fluid pressure operated transmission shifting structure wherein shifting of the transmission is controlled by a plurality of aligned, parallel, movable shift rods, comprising: shift rod engaging means; a fluid pressure operated selecting cylinder and a plurality of relatively movable pistons slidable within said cylinder; a piston rod extending from said selecting cylinder and movable in response to movement of said pistons therewithin, said piston rod being connected to said shift rod engaging means for moving same into engagement with said shift rods, one at a time; at least three conduits communicating with said selecting cylinder at axially spaced points therealong and between the respective piston means therewithin, said conduits being adapted to supply pressure to said selecting cylinder to move said pistons with respect to each other to selected positions therewithin whereby said shift rod engaging means is placed in engagement with one of said shift rods at a time, said pistons being operable only by fluid pressure so that they will move immediately in response to pressurizing of said conduits and will remain in whatever position they are placed until different ones of the conduits are pressurized; a fluid pressure operated shifting cylinder and a plurality of relatively movable pistons slidable within said shifting cylinder; a piston rod extending from said shifting cylinder and movable in response to movement of said pistons therewithin, said last-named piston rod being connected to said shift rod engaging means for causing longitudinal movement thereof between neutral and shifted positions; at least three conduits communicating with said shifting cylinder at axially spaced points therealong and between the respective pistons therewithin, said conduits being adapted to supply pressure to said shifting cylinder to move said pistons with respect to each other to selected positions therewithin whereby said shift rod engaging means is placed in neutral or shifted positions, said pistons within said shifting cylinder being movable only in response to fluid pressure supplied through said conduits so that same will move immediately in response to pressurizing of said conduits and will remain in whatever position they are placed in until different ones of the conduits are pressurized; a manually movable selector movable longitudinally through an elongated passageway and laterally into recesses offset from said passageway and on either side thereof; a first valve including a movable valve element and a plurality of outlet ports corresponding in number to the conduits connected to said selecting cylinder, said outlet ports being connected to said conduits so that said first valve controls pressurizing of said selecting cylinder, said movable valve element being connected to said selector and being movable in response to longitudinal movement of said selector to connect selected ones of said output ports to said conduits when said selector is in alignment with one of said recesses and thereby immediately move said pistons in said selecting cylinder to a position where said shift rod engaging means is placed in engagement with one of the shift rods; a second valve including a movable valve element and a plurality of outlet ports, said outlet ports being connected to the conduits for said shifting cylinder so that pressurizing of selected ones of said outlet ports will cause immediate pressurizing of said shifting cylinder to cause shifting of the selected shift rod, said movable valve element of said second valve being connected to said selector and being movable in response to lateral movement thereof into said recesses and being operative to position said second valve to connect selected ones of said outlet ports to a fluid pressure source when said selector is in one of said recesses and thereby move said pistons means in said shifting cylinder to a position where said shift rod engaging means is in a shifted position whereby when said selector is in said passageway said shift rods are in neutral and when said selector is moved into a recess on either side of said passageway a shift rod is immediately shifted, the parts being so arranged so that the positions of the pistons within the selecting and shifting cylinders correspond to the position of the selector and same will rapidly respond to movement of said selector to cause selection and shifting of a shift rod.

References Cited in the file of this patent
UNITED STATES PATENTS

| | | |
|---|---|---|
| 2,137,961 | Vorech | Nov. 22, 1938 |
| 2,157,592 | Cosler | May 9, 1939 |
| 2,346,820 | Cosler et al. | Apr. 18, 1944 |
| 2,451,160 | Eaton | Oct. 12, 1948 |